United States Patent [19]

Gow

[11] Patent Number: 5,636,577

[45] Date of Patent: Jun. 10, 1997

[54] BAMBOO PALLET

[76] Inventor: Robert H. Gow, 4707 Pin Oak Park #544, Houston, Tex. 77081-2251

[21] Appl. No.: 528,118

[22] Filed: Sep. 14, 1995

[51] Int. Cl.⁶ ................................................. B65D 19/00
[52] U.S. Cl. ..................................... 108/51.1; 108/51.3
[58] Field of Search ................................. 108/51.1, 51.3, 108/56.1, 56.3; 297/452.63, 446.1

[56] References Cited

U.S. PATENT DOCUMENTS

| | | | |
|---|---|---|---|
| 2,955,791 | 10/1960 | George | 108/51.1 |
| 3,207,096 | 9/1965 | Munroe | 108/51.1 |
| 3,645,550 | 2/1972 | Biehl | 297/452.63 |
| 4,184,435 | 1/1980 | Shevchenko | 108/51.1 |
| 4,384,531 | 5/1983 | Spurgeon | 108/51.1 |
| 4,714,026 | 12/1987 | Yamaguchi et al. | 108/51.3 X |
| 5,067,418 | 11/1991 | Carter | 108/56.3 |
| 5,275,454 | 1/1994 | Deardoff | 297/446.1 X |
| 5,385,625 | 1/1995 | LaFramiere . | |
| 5,390,467 | 2/1995 | Shuert . | |
| 5,404,829 | 4/1995 | Shuert . | |
| 5,408,833 | 4/1995 | Crabb, Jr. . | |
| 5,409,110 | 4/1995 | Patent . | |
| 5,413,052 | 5/1995 | Breezer et al. . | |
| 5,413,224 | 5/1995 | Marron et al. . | |
| 5,413,662 | 5/1995 | Skinner, III . | |
| 5,417,167 | 5/1995 | Sadr . | |
| 5,423,114 | 6/1995 | Johnson . | |
| 5,423,118 | 6/1995 | Lotti . | |
| 5,425,314 | 6/1995 | MacFarland . | |
| 5,485,794 | 1/1996 | Sing | 108/51.1 |

OTHER PUBLICATIONS

International Network for Bamboo and Rattan, *Bending Strength of Guadua Bamboo*, Working Paper No. 3, 1994.

*Primary Examiner*—Jose V. Chen
*Attorney, Agent, or Firm*—Hutcheson & Grundy

[57] ABSTRACT

Pallets for storage or movement of goods are provided having bamboo members. Split bamboo forms cross-members and successive layers as part of the two major surfaces of pallets. Bamboo culms are used for beams of a pallet or as components in a post-type structure. Frames of split bamboo may be fastened and removed from beams or posts of bamboo to allow more compact movement of pallets not in use. Elongated posts of bamboo culms may be used to join individual pallets for multi-deck pallets.

3 Claims, 4 Drawing Sheets

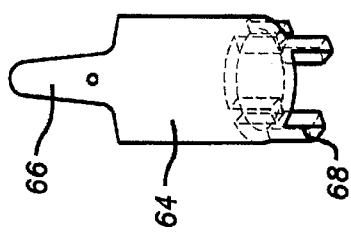
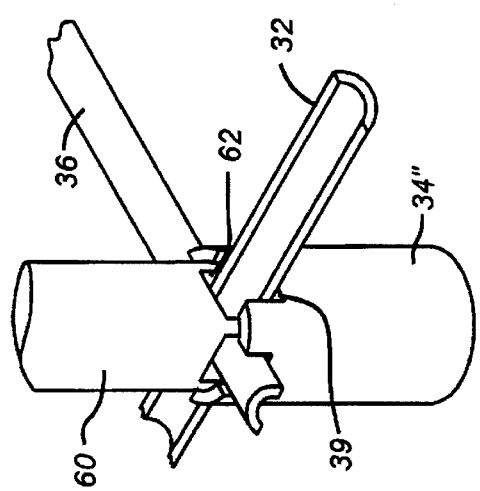
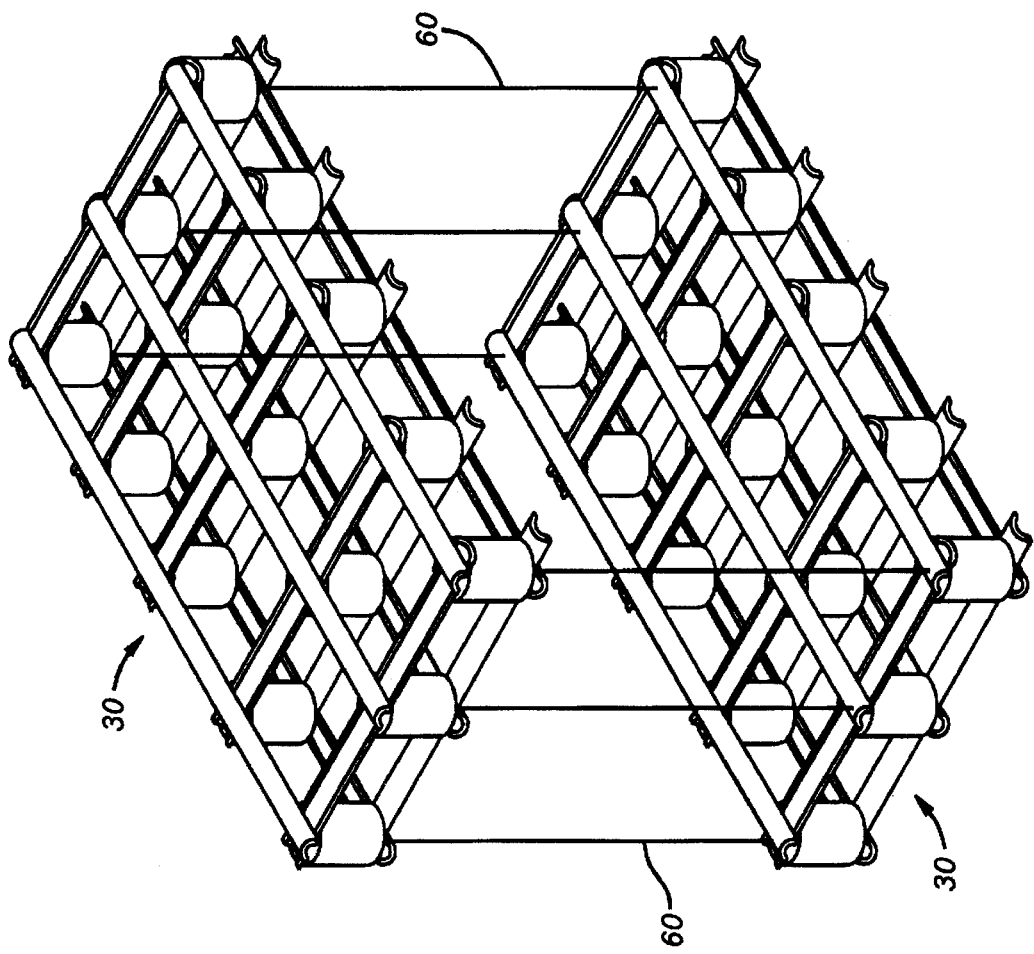

BAMBOO PALLET

FIELD OF THE INVENTION

This invention pertains to a pallet to be used in transporting or storing goods. More particularly, a pallet containing bamboo members is provided.

BACKGROUND OF THE INVENTION

Pallets have long been used in transport and storage of goods. They are constructed from a variety of materials, but primarily from wood lumber. The lumber is often made from hardwood. A common wood pallet is made of two sizes of lumber. The thick size commonly has a cross-section of 3½ inches×1½ inches. Three pieces with this cross-section run in a first direction to form beams. Across these beams on the top and bottom are thinner pieces of wood nailed or otherwise fastened at right angles to the beams to form the top and bottom surfaces of the pallet. Thin pieces typically have a cross-section of ½ inch thick by 2 to 6 inches wide. It has been estimated that over 50% of the cost of pallets made of wood lumber consists of the cost of the lumber, assuming the pallet is shipped less than 200 miles from its construction site.

Other materials such as plastic and corrugated paper have also been proposed for making pallets. Recent U.S. Pat. No. 5,417,167, for example, discloses a pallet made from hollow plastic stringers and plastic deck boards. Another recent patent, U.S. Pat. No. 5,425,314, proposes a disposable pallet made of paperboard or like material. The cost of the materials is a significant disadvantage of pallets made from plastic and paperboard.

The construction of a pallet containing bamboo board has been suggested. The pallet is made of long wooden beams and multilayered bamboo fibre fabric, flame retardant and thermosetting adhesive (Abstract in World Patent Index of China Pat. No. 1079707).

Bamboo is widely grown in tropical areas of the world. It exists in a number of varieties. The structure of bamboo is strikingly different from that of trees and many other plants. The trunk of the bamboo plant is called the "culm." Nodes exist at various distances along the culm. The culm is hollow inside except where nodes exist. Some varieties of bamboo, such as Dendrocalamus Strictus, Guadua, Jimba, or Cana Bravo, produce particularly thick-walled culms. The culms of bamboo have a hard outer skin which provides a surface particularly resistive to physical damage.

The physical properties of bamboo are somewhat unique also. Bamboo is stronger than most wood which is used to make pallets. Bamboo is also more flexible and elastic. When flexed, it bends slightly and will not break as easily as wood. When flexed or deformed for a short period of time, it will return to its original configuration. Bend strength of a variety of bamboo has been reported in "Bending Strength of Guadua Bamboo," Int'l. Network for Bamboo and Rattan, Working Paper No. 3, 1994. As expected, the strength of bamboo is highly dependent on wall-thickness, for either round members or split specimens. Strength may also vary depending on position along the culm.

Bamboo is easily treated with chemicals, such as preservatives or fire retardants, if desired. Some methods, such as the Boucherie/Sap Displacement method, can be used which make it easier to treat bamboo than wood, because all the fibers in bamboo run in the same direction.

Once established, bamboo replenishes itself very fast. Therefore, bamboo culms can be cut every two to three years. Hardwoods may take twenty or more years to grow and when cut must be started again from small trees. Bamboo can be planted along permanent roads. Therefore, it can be transported easily to a factory. A very large volume of bamboo timber can be produced on small acreage, and bamboo responds economically to fertilizer and irrigation.

While a variety of materials have been suggested and utilized for constructing pallets, the inherent growth and strength properties of round and split bamboo culms have not been realized as components of pallets. Pallets and construction methods for such pallets comprising bamboo are needed.

SUMMARY OF THE INVENTION

In one embodiment, split bamboo cross-members are fastened to wooden beams to form a pallet for storage and movement of goods. In another embodiment, bamboo culms are used to form the beams of a pallet. In yet another embodiment, a second or additional layer or layers of split bamboo are fastened over the layer of cross-members in a direction transverse to the cross-members. In yet another embodiment, the cross-members or additional layers are fastened at their intersections to form a frame of split bamboo, which frame may be removed from beams for more efficient movement of pallets when not in use. The other skin of bamboo preferably forms the outer major surfaces of the split bamboo when used in a pallet. A variety of means for fastening may be used, including staples, nuts and bolts, nails, adhesive and other means.

Bamboo culms may be cut into short cylinders which are used to form a pallet of post-type construction. Cross-members of split bamboo are used to join the cylinders or posts, and subsequent layers of split bamboo are placed transverse to the cross-members. A frame of split bamboo may by fastened to the posts. The posts are spaced apart to accommodate entry of the tines of a forklift vehicle. Posts may be notched so that cross-members and members of split bamboo used to form a major surface of the pallet are placed in the notches, where they may be restrained by pins, straps or other means. Such pallets are capable of easy disassembly for transport or repairs.

To allow stacking of pallets when a pallet cannot be stacked on goods loaded on another pallet, the post-type construction of pallets allows extension of selected posts from a first pallet to a second pallet, forming a double-deck pallet, using bamboo culms as the extension posts. Means are provided for mating the bamboo elongated posts between decks of the pallet.

BRIEF DESCRIPTION OF THE DRAWINGS

FIG. 7 is a detailed drawing of a multiple deck pallet having round bamboo as posts.

FIG. 8 is a detailed drawing of posts joining the lower deck of a multiple deck pallet.

DETAILED DESCRIPTION OF PREFERRED EMBODIMENT

Figure 1:
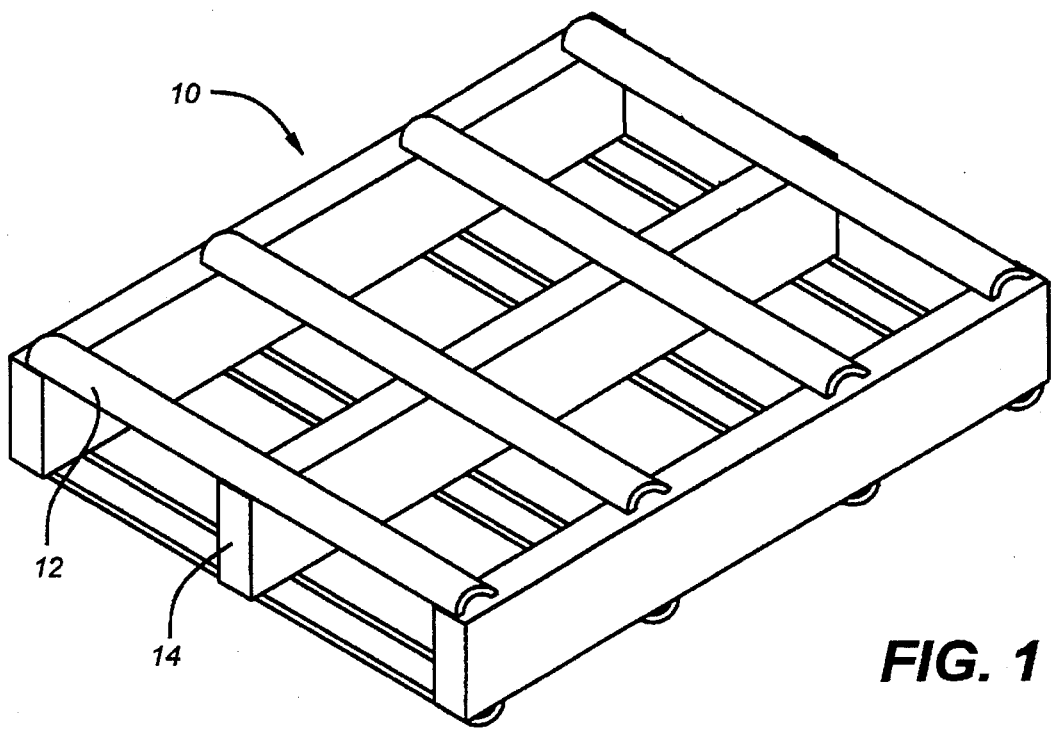
FIG. 1 is a drawing of a pallet having wooden beams and split bamboo cross members.

Referring to FIG. 1, pallet 10 having split bamboo crossmembers 12 on conventional wooden beams 14 is shown. Split bamboo member 12 is made from a culm of bamboo plant which is split into dimensions to make a preferred thickness and width of crossmember 12. Depending on the original size of the culm, it may be split into two or into four, eight or more strips. Preferably, the culm is split in dimensions to make a thickness and width of the bamboo crossmember to provide needed strength to the pallet for the loads under which it will be used. Split bamboo 12 may be sanded or planed on the inside of the culm, which is significantly softer than the outside surface of the culm. This sanding or planing may be along the entire length of crossmember 12 or may only be at positions along crossmember 12 that will be placed adjacent to beams 14. Bamboo crossmembers may be shipped as individual pieces for later assembly into pallets.

Bamboo can be split easily with a star splitter. A culm can be split into multiple pieces by this multi-bladed instrument which is driven into the end of the bamboo culm. The split naturally proceeds along the fibers, which are all in the same direction. Therefore, the rip sawing down the length of a log to make lumber is not necessary to make smaller pieces of bamboo. This contributes to the lower cost of bamboo as a material for pallets.

A disadvantage for bamboo in some application is the growth habit of not producing straight culms. Bamboo culms often grow in arcs as outer culms reach for sunlight. If a bamboo culm is properly split into four quarters, however, it will be split so that one quarter is the outside area of a bend and a second quarter is the inside arc of the bend. Once split, these two pieces can be straightened relatively easy by putting weight on them. The side pieces are more difficult to straighten. However, use of bamboo in pallets allows the opportunity to utilize even the sections of culms which are not straight, since it is often not necessary that the crossmembers be evenly spaced. Also, the split pieces can be straightened as they are fastened to the beams. Although the crossmembers of split bamboo are shown in a direction at right angles to the beams in FIG. 1, it should be understood that in all construction with crossmembers, including those which follow in successive figures, crossmembers may be placed at any angle which allows crossmembers to intersect the beams. A variety of fasteners may be used in the pallets of this invention, including staples 15, nut and bolts 17 and adhesive, as shown in FIG. 1.

Figure 2:
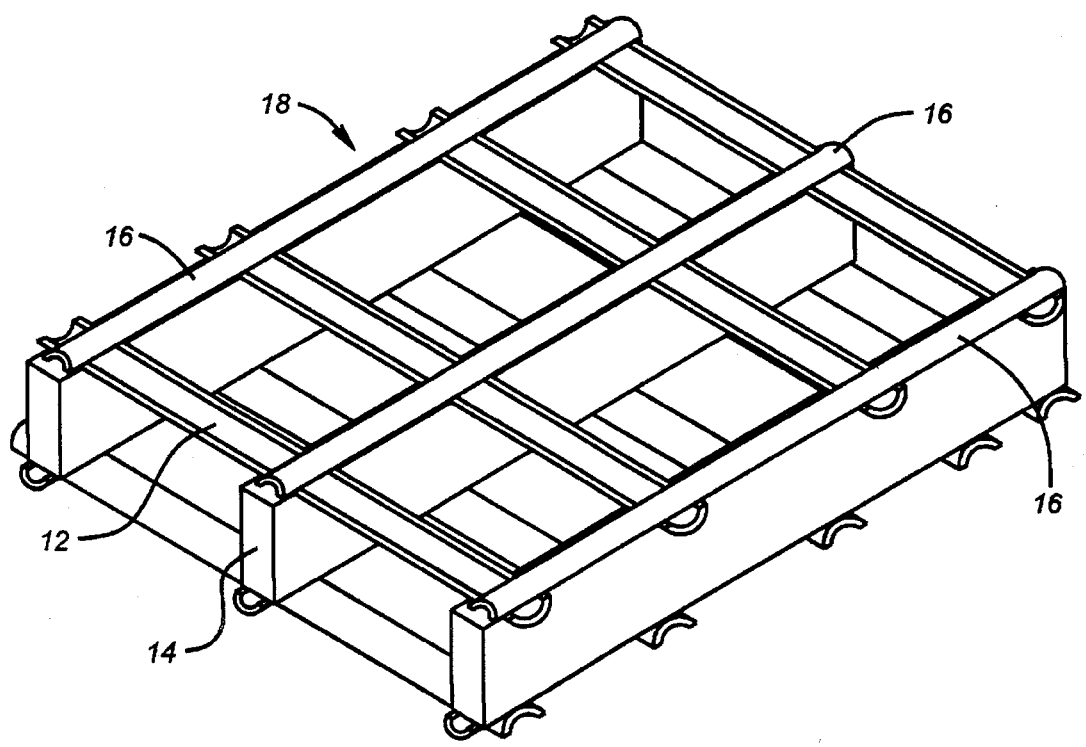
FIG. 2 is a drawing of a pallet having wooden beams and split bamboo frames attached thereto.

Whereas the convex outside of the split bamboo culm is upward on a major side surface and is disposed to receive the material to be placed on the pallet in FIG. 1, FIG. 2 illustrates the convex side of the split bamboo being placed in the direction toward beams 14 such that the outer skin of the split bamboo is disposed to contact the tines of a fork lift vehicle. Whereas a pallet may be constructed with only beams 14 and crossmember split bamboo 12, with a selected number of crossmembers of split bamboo to achieve the desired spacing of the crossmembers and the desired strength of the pallet, alternatively, additional members 16, being split bamboo, may be placed in juxtaposition to crossmembers 12 and along the direction of beams 14. Such members 16 preferably have the outside of the culm disposed away from the beams so as to provide a load surface for materials placed on the pallet. This design may provides a ½ inch or so round ridge along the sides of the pallet to help keep the load on the pallet from sliding off if split bamboo is placed only on the outside edge of the frame, i.e., with the center split bamboo member shown in FIG. 2 removed. However, it is also anticipated that a complete second layer of split bamboo such as member 16 may be fastened to the first layer of split bamboo consisting of crossmembers such as 12. Although the crossmembers 12 and members 16 are shown to be orthogonal, they may be placed at any transverse angle. Adjacent crossmembers or members in the same layer may be in contact or may be spaced apart.

It should be noted that split bamboo crossmember pieces 12 and members 16 need not be straight. The distance between crossmembers in conventional pallets is greater than the amount of curvature of most bamboo culms. Even if the side pieces after splitting of a curved bamboo culm are used, there should be adequate strength and sufficiently small spacing between crossmembers 12. The spacing of crossmembers is selected depending on the uses of a pallet. For minimum weight, fewer crossmembers 12 are used, whereas for maximum strength the maximum number of crossmembers 12 are used. Crossmembers 12 may be ground or cut on the soft side to produce the preferred thickness. There may be selective grinding or cutting over only those areas which will be placed in juxtaposition to other members of the pallet.

A frame of bamboo comprising crossmembers such as crossmembers 12 of FIG. 2 and added members such as member 16 of FIG. 2 may be constructed independently of beams 14. Such a frame is designated as frame 18 of FIG. 2. The split culm frame may be shipped as a flat frame and attached to beams such as beams 14 of FIG. 2 or any other support at an appropriate time and place. A similar frame may be placed on the opposite side of beams such as beams 14 of FIG. 2 to complete a pallet, or a frame having more or fewer crossmembers and members may be used. Each frame may be attached to beams 14 in conventional fastening methods, well known to those skilled in the art. Such frame comprising split bamboo members such as 12 and 16 may be supplied with predrilled holes for more ease in attachment to beams of a pallet. In this design, the hard round side of crossmembers 12 is in contact with the forks which may be used with a forklift in handling of the pallet. Having the hard side of bamboo contacting the forks should decrease wear of the pallet as it is used with a forklift. The hard side of bamboo is also in contact with a load of the load-surface.

Split bamboo crossmembers and members are fastened where they intersect to form frame 18. Fastening may be by any appropriate fastening means, such as by nails, bolts (preferably after holes are drilled through the bamboo), staples, or adhesive. Combinations of any fastening means may be used. If staples are used, the staples preferably penetrate both a crossmember and member at their intersection and are bent or flattened to prevent their withdrawal under load.

Figure 3:
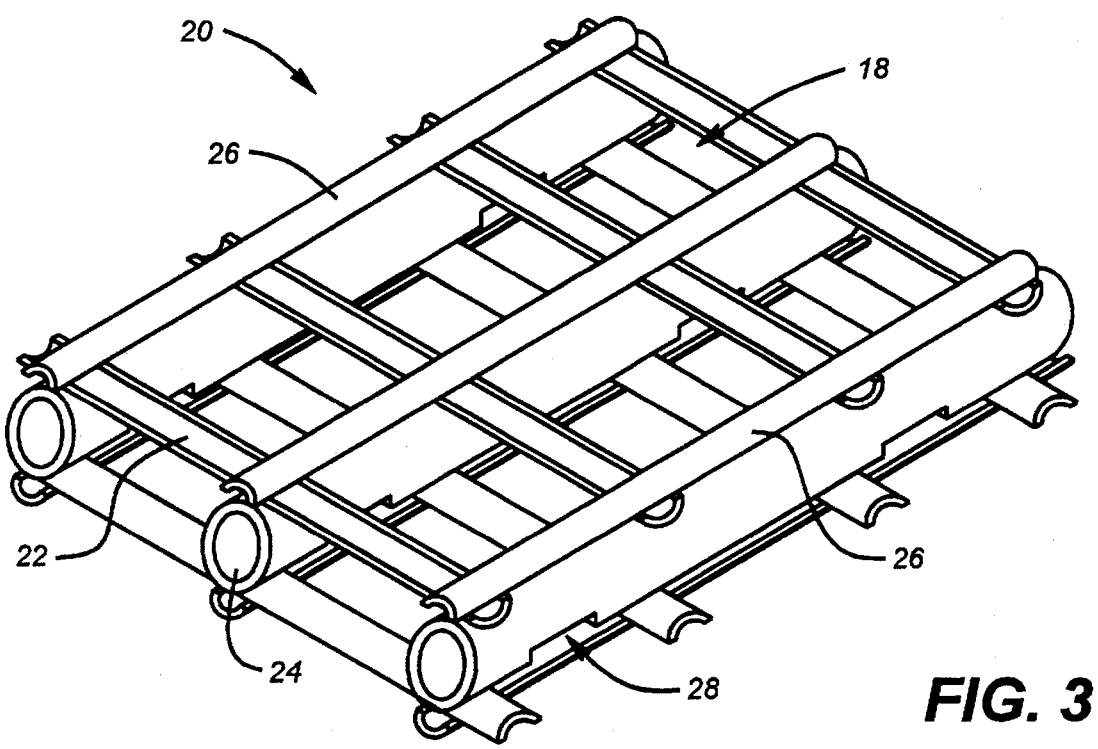
FIG. 3 is a drawing of a pallet having bamboo culms as beams and split bamboo frames attached thereto.

Whereas the designs shown in FIGS. 1 and 2 replace only the thin wood pieces of a conventional wood pallet with bamboo, FIG. 3 shows pallet 20 having bamboo beams 24. Bamboo beams 24 preferably have a diameter of about 3½ inches, such that the distance between the upper major surface and lower major surface of the pallet would be a common size, but may be larger or smaller in diameter. Frame 18, illustrated in FIG. 2 may also be used in pallet 20 of FIG. 3. Alternatively, only crossmembers such as 22 may be used. In another embodiment, members 26 are used as needed to adapt pallet 20 to its intended purposes. Such crossmembers, members or frames are placed above and below the bamboo beams 24 to form a pallet. A pallet can be flipped to use a major side to contact either a load or a support. Cap 25 may be added to the end of bamboo culms in the pallet of this invention.

Frame 18 or crossmembers 22 and members 26 preferably are attached to beams 20 using holes drilled through frame pieces or members 22 and 26 and beams 24. Screws, bolts, staples or other forms of fasteners may be placed through drilled holes. Alternatively, fastening means such as straps (not shown) may be applied around bamboo beams 24 and split bamboo to be attached thereto.

Beams 24 may be made of culms which are slightly larger than 3½ inch diameter, but which are flattened on opposite sides of the culm such as to form flat surfaces 3½ inches apart. Such surfaces may extend the length of the beam or may be formed only in those areas which will be in juxtaposition to crossmembers 22. Beams 24 are to be spaced apart so as to allow tines of a fork lift vehicle to enter between the beams. Notches 28 may be cut along beams 24 at a position to adapt to tines of a fork lift vehicle for lifting pallet 20 from a position transverse to beams 24. The tough skin of the outside of the culms of beams 24 will be very resistant to damage from the forks of a fork lift vehicle.

If culms of the preferred diameter are not available as beams 24 of FIG. 3, thinner diameter culms or split culms can be used by fastening together such smaller segments. Such segments may be fastened together by adhesive, by ties encircling such beams or by a combination of these methods, such ties preferably made of metal.

Figure 4:
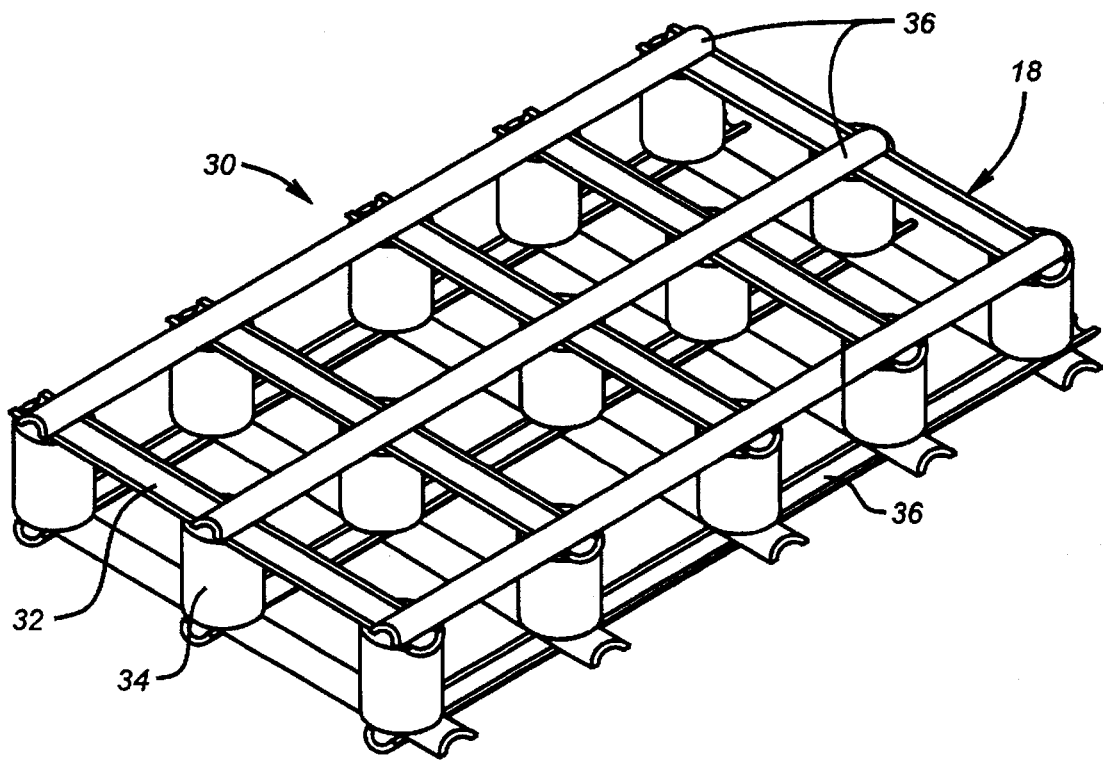
FIG. 4 is a drawing of a pallet having sections of round bamboo culms as posts separating split bamboo frames attached thereto.

Referring to FIG. 4, pallet 30 is comprised of cross members 32 and members 36, which may be fastened together to form frame 18, or may be used to connect posts 34. Frame 18 may-be a frame such as described above in reference to the frame of FIG. 2, or may contain only the number of crossmembers and members shown in FIG. 4. Crossmembers 32 and members 36 or frame 18 are fastened to a plurality of posts 34, the posts being segments of bamboo culm. The posts may be cut to about 3½ inch length if common spacing is desired between upper major surface and the lower major surface of pallet 30. It is understood that spacing of members and cross-members of frame 18 may vary for the frame making up the upper and lower surfaces of pallet 30. Frames may be fastened to posts 34 by bolts extending through upper and lower frames 18 and through post 34. The number of posts 34 is selected to provide the strength needed for the anticipated applications of the pallet. Preferably, posts 34 are omitted in both minor sides of the pallet at spaced apart locations where tines of lift vehicles may be used to lift pallet 30. Pallet 30 may be flipped to use either major side to contact either a load or a support.

Figure 5A:
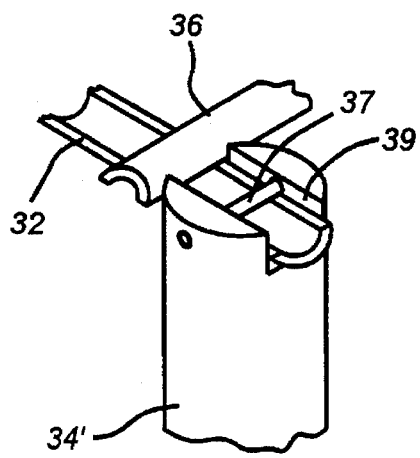
FIG. 5 is a detailed drawing of notched construction for posts made of bamboo culms pinned to a split bamboo frame.
Figure 5B:
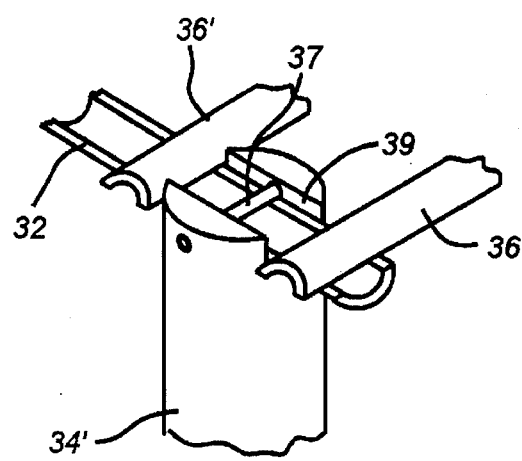
Figure 5C:
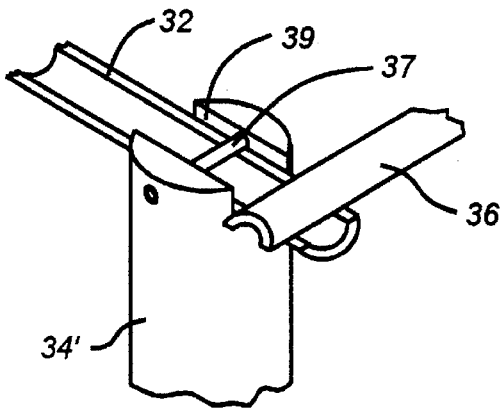

FIGS. 5(a), (b) and (c) show details of an alternate means for fastening cross members and members of split bamboo, either as individual pieces or as members of a frame such as frame 18, to posts 34' of a pallet such as pallet 30 of FIG. 4. Post 34', made from bamboo culm, has notch 39 adapted to receive cross member 32. Member 36, also split bamboo, is fastened to cross member 32. Cross member 32 is held in notch 39 by pin 37. Pin 37 may be a threaded bolt or any of a large variety of pins sized for post 34'. Member 36 may be placed inside post 34', as in FIG. 5(a) or outside post 34', as in FIGS. 5(b) and (c). In FIG. 5(b), member 36' is shown, which is one of a plurality of members extending transverse to cross-members 32. Preferably, notch 39 is cut to a depth so as to cause the upper surface of member 36 to be approximately aligned with the top of post 34'.

Figure 6:
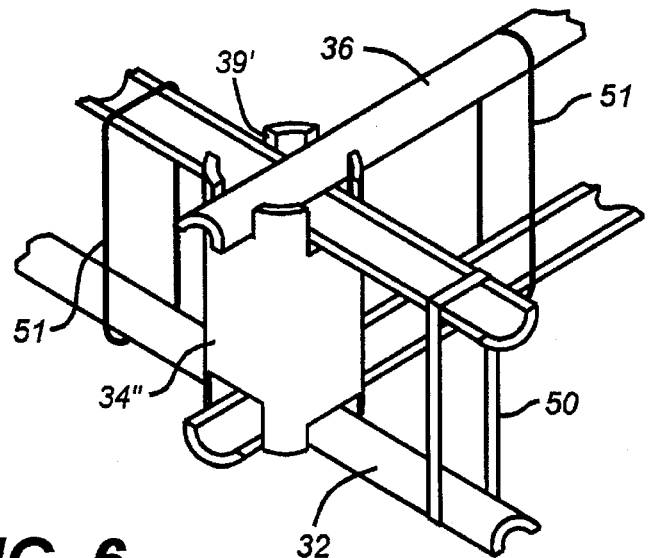
FIG. 6 is a detailed drawing of notched construction for posts made of bamboo culms with split bamboo restrained in the notches by straps or such.

In FIG. 6, detailed drawings show yet another embodiment of pallet 30 in which post 34" has been notched in orthogonal directions so as to receive split bamboo crossmember 32 and member 36. These members, either individually or as members of a frame such as frame 18, are fastened to post 34" by strap 50 or wire 51 surrounding members forming the upper and lower surfaces of pallet 30. Preferably, notch 39, is made to have a depth such that the top of member 36 will align with the top of post 34". With such means of fastening split bamboo together, straps such as strap 50 or wires such as wire 51 can be readily cut when pallet 30 is to be moved with no load attached. By knocking down the pallet such that split bamboo members or frames comprised of split bamboo members can be stacked directly together, more efficient hauling of the pallets for successive use is possible. Posts 34 may be separately stacked in less space and returned for re-assembly with members 32 and 36. Pallets may be constructed and shipped disassembled to their first site of use. These means of ready disassembly and assembly of pallet 30 and other pallets of this invention will reduce the cost of their use by reducing shipping costs of empty pallets.

In some uses of pallets, it is desirable to use multiple decks for pallets, particularly when it is desirable to stack pallets containing goods on which another pallet cannot be stacked. In this application, extended posts of bamboo culm can be used to support an upper deck of a pallet. Such a double-deck pallet is shown in FIG. 7. Each deck may be constructed as shown in FIG. 6 to form pallet 30. Posts 60 are used to matingly assemble decks 30. The length of posts 60 is selected to accommodate goods between the two decks. It should be understood that additional decks may be similarly assembled to form a plurality of assembled decks.

FIG. 8(a) shows details of the assembly at upper major surface of lower deck 30. The same description applies to the assembly at the lower major surface of upper deck 30. Post 60 has a selected diameter and is notched so as to allow post 60 to mate inside post 34" as split bamboo members 32 and 36 pass through notch 62. Alternatively, post 60 may be mated with connector 64, shown in FIG. 8(b). Connector 64 may have notch 68 and finger 66. Finger 66 is adapted to extend inside a bamboo culm and add rigidity to the mating of post 60 and post 34". Connector 64 may be constructed of metal or plastic. Although post 60 is shown to be smaller in diameter than post 34", it should be understood that post 60 may also have greater diameter than post 34" and be similarly mated to post 34".

In some applications of pallets there is potential for material from the environment to enter the round bamboo members which are used for beams or posts. When such uses are anticipated, the ends of bamboo culms may be sealed or capped to keep out unwanted liquid or solids. Sealant may be a plastic or elastomer plug or cap, a wood plug or any other inexpensive material.

It may also be desirable to increase the bending strength of round bamboo members in some applications. This may be accomplished by placing a steel rod or the like inside the culm. If the rod is smaller in diameter than the hollow portion of the culm, the rod may be supported with an adaptor which contacts the inside surface of the culm and the rod so as to transfer bending loads from the bamboo to the rod. If the bamboo is subjected to unusual force which may cause splitting of a culm, such as around the mating assembly of post 60 and post 34" of FIG. 8(a), banding may be placed around the culm, such as post 34", to prevent the bamboo from splitting under unusually high loads.

While split bamboo has been disclosed for cross-members and members, it should be understood that small diameter whole bamboo culms may be used along with or instead of split bamboo. They may be fastened using means described for split bamboo. For example, a staple may be used to fasten each small culm to a beam. Split bamboo may be used on one of the major surfaces of a pallet and round bamboo culms on the second major surface.

Other variations and embodiments of the invention will be recognized by one skilled in the art, and it is intended that the invention be limited only as set forth within the claims appended hereto.

What is claimed is:

1. A frame adapted to be fastened to beams of a pallet useful in the storage and movement of goods loaded thereon, comprising:

a plurality of layers of cross-members and members, the layers being in juxtaposition, including an uppermost layer and a lowermost layer, the cross-members of each layer being not aligned with the members of the adjacent layer, the cross-members and members being split bamboo, wherein outer side of the split bamboo forms a surface of the uppermost layer and the lowermost layer, the surfaces of the split bamboo of the cross-members and members being convex in opposite directions; and means for fastening a cross-member of one layer to a member of another layer at points of intersection of the cross-member and member.

2. A pallet of post-type construction useful in the storage and movement of goods loaded thereon, comprising:

a plurality of posts, the posts being sections of bamboo culms cut to a selected length along their axis and having a first and second end;

on each of the first and second ends of the posts, a plurality of crossmembers interconnecting the posts to form a first layer of crossmembers, the crossmembers being split bamboo;

a plurality of members transverse to the crossmembers, the members being split bamboo; and means for fastening the crossmembers to the members and to the posts, wherein the means for fastening the crossmembers and members to a plurality of the posts on at least one end is two notches in the posts, the notches being orthogonal, the notches further being adapted to receive a crossmember and a member, and a strap or wire in proximity to a post and extending around the crossmember or member and a crossmember or member in a plane aligned with the second end of the posts so as to confine the crossmember or member to the notches.

3. A pallet of post-type construction useful in the storage or movement of goods loaded thereon while stacking the goods in a plurality of decks, comprising:

a first deck comprising a plurality of posts, the posts being sections of bamboo culms having an inside and an outside and cut to a selected length along their axis and having a first and second end;

on each of the first and second ends of the posts, a plurality of crossmembers interconnecting the posts to form a first layer of crossmembers, the crossmembers being split bamboo;

a plurality of members transverse to the crossmembers, the members being split bamboo;

means for fastening the crossmembers to the members and to the posts;

a plurality of elongated posts of selected lengths adapted to support a spaced apart second deck and matingly adapted to a plurality of the posts of the first deck wherein the elongated posts are matingly adapted by plastic or metal connectors having notches sized so as to receive crossmembers and members of a deck and a finger adapted to the inside of a bamboo culm; and a second deck, the second deck being substantially the same as the first deck and matingly adapted to the elongated posts.

* * * * *